Feb. 22, 1927.

J. C. LINCOLN 1,618,962

DYNAMO ELECTRIC MACHINE

Filed May 13, 1921     3 Sheets-Sheet 1

INVENTOR:
JOHN C. LINCOLN
BY
ATTORNEY

Feb. 22, 1927.

J. C. LINCOLN 1,618,962

DYNAMO ELECTRIC MACHINE

Filed May 13, 1921  3 Sheets-Sheet 2

INVENTOR:
JOHN C. LINCOLN
BY
Frank L. Sessions
ATTORNEY

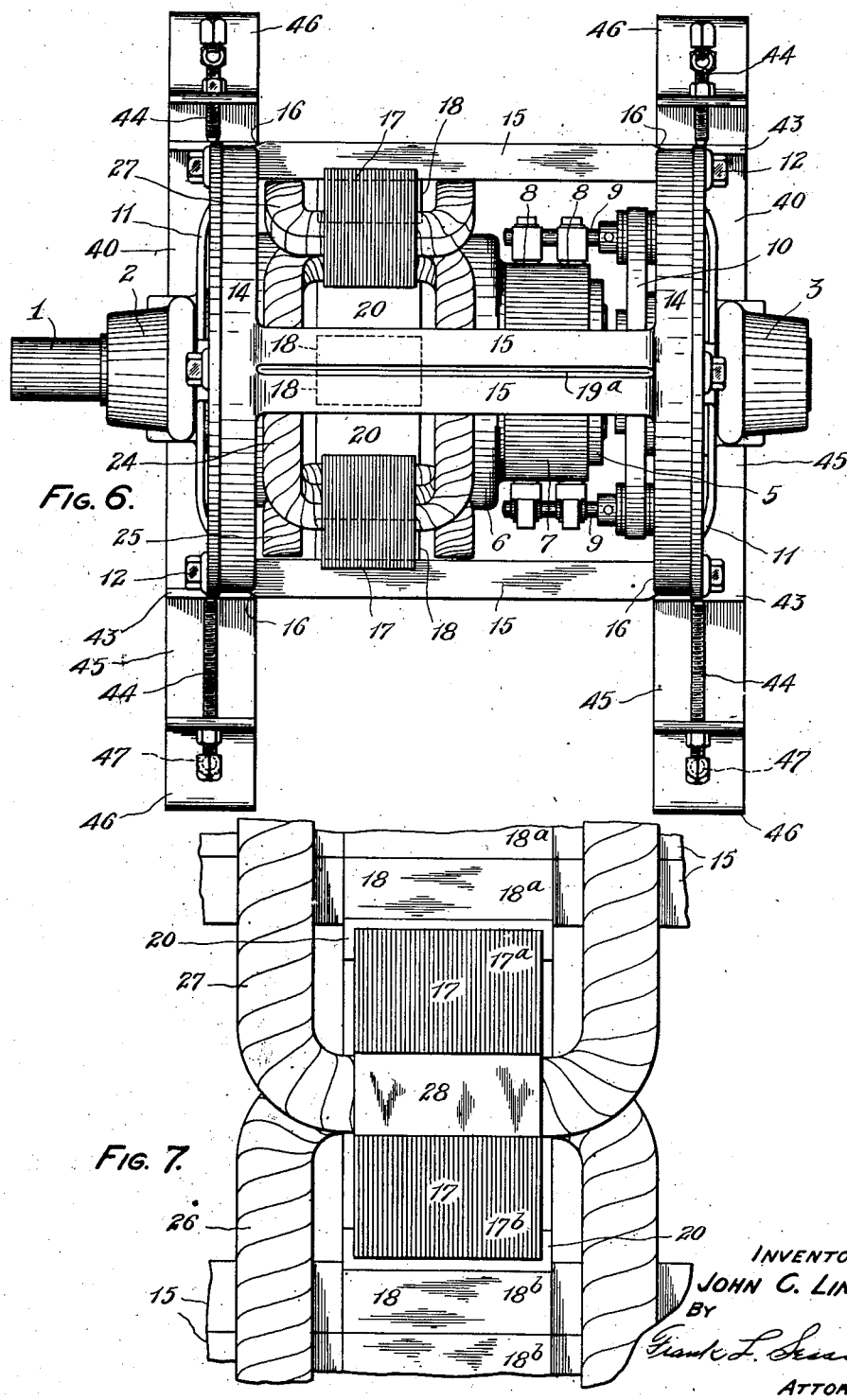

Patented Feb. 22, 1927.

1,618,962

UNITED STATES PATENT OFFICE.

JOHN C. LINCOLN, OF EAST CLEVELAND, OHIO.

DYNAMO-ELECTRIC MACHINE.

Application filed May 13, 1921. Serial No. 469,192.

My invention relates to improvements in direct current dynamo electric machines and has for its principal objects, the provision of a machine of this class of greater capacity for a given weight than that of machines of heretofore known construction; the provision of a machine of this class which for a given capacity shall occupy a smaller space than machines of heretofore known construction; the provision of a dynamo electric machine in which the magnetization set up by current in the armature is less than in machines of heretofore known construction; the provision of a dynamo electric machine of improved commutation; the provision of a new and useful method of reducing distortion of the magnetic field; the provision of a new and useful field frame for dynamo electric machines; the provision of a field frame for dynamo electrc machines having pole pieces divided into a plurality of magnetically isolated portions and having yokes of magnetizable material joining the several pole portions with the corresponding portions of the adjacent pole of opposite polarity; and the provision of a machine of this class which can be manufactured at less cost than those of the same capacity of heretofore known construction. These and other objects of my invention which will be apparent to those skilled in the art, are attained in the dynamo electric machine described in these specifications and shown in the accompanying drawings, in which—

Fig. 6 is a plan view of the machine shown in Fig. 1;

Fig. 7 is a fragmentary interior view of the machine along line VII—VII of Fig. 4.

Figure 1:
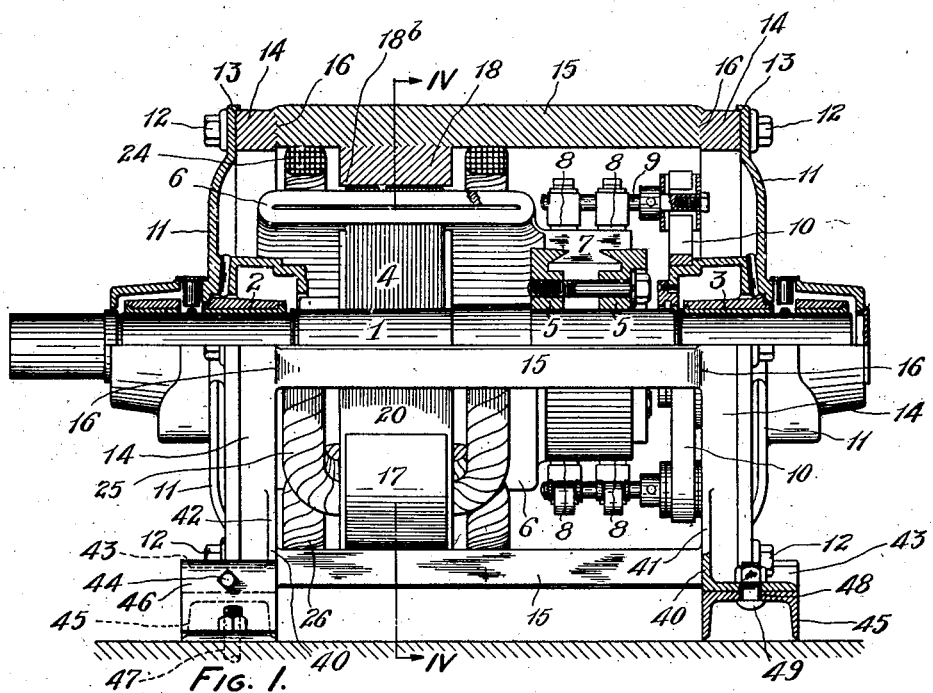
Fig. 1 is a side view, partly in longitudinal section on line I—I of Fig. 2, of a machine embodying my invention.
Figures 2, 3:
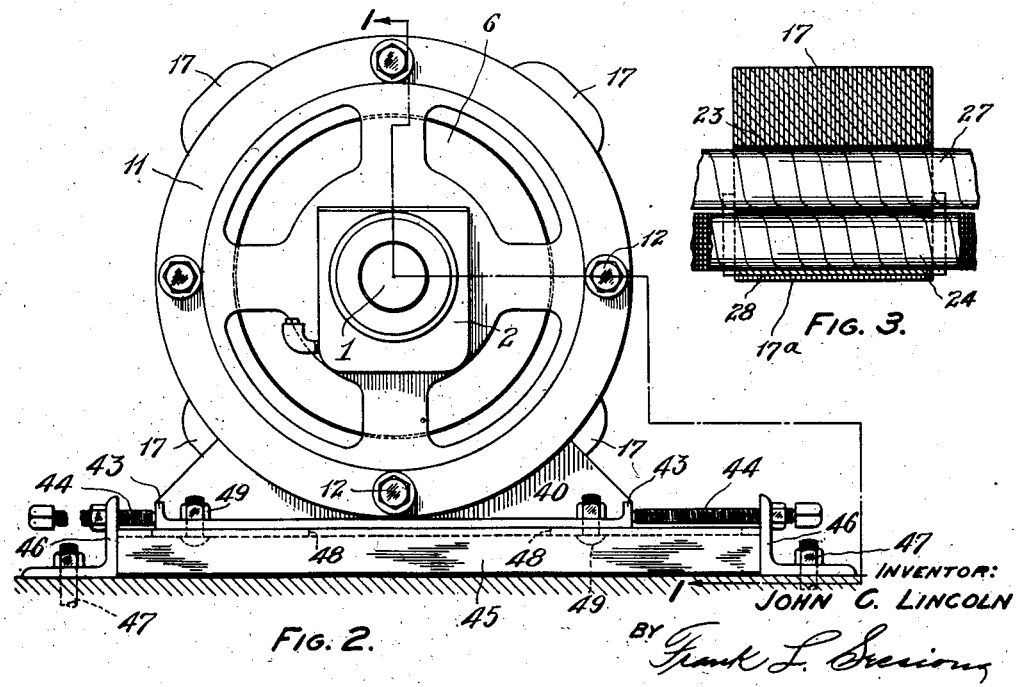
Fig. 2 is an end view of the machine shown in Fig. 1.
Fig. 3 is a section on line III—III of Fig. 4.

The rotating portion of my dynamo electric machine, known as the armature or rotor, is similar in all respects to the armatures, or rotors of well known direct current generators and motors. It will be understood, therefore, that while the drawings show only one type of armature, any other suitable rotor may be employed in machines embodying my invention. It will be further understood that my improvements are equally applicable to both electric generator and motor construction and that the terms, "dynamo," "dynamo electric machine," "generator," "motor," or "machine" used in these specifications are not to be construed as limiting the scope of my invention.

Referring to the drawings, 1 is an armature shaft mounted for rotation in any suitable bearings, 2, 3, and having mounted upon it and secured to it for rotation with it the armature core laminations, 4, and the commutator shell or flanges, 5.

The armature coils, 6, as shown, are disposed in peripheral slots in the armature core and are connected in any usual manner to the commutator bars, 7. Collecting brushes, 8, are supported in suitable brush holders which may be mounted upon studs, 9, secured to but insulated from the brush rocker-arm, 10. The bearings, 2, 3, may be supported by bearing yokes or housings, 11, which are secured to the frame of the machine by bolts or cap screws, 12, and held in concentric relation to the bore of the fields by suitable means, such as the counter-bored shoulders, 13.

I prefer to construct the magnetic field frame of my dynamo electric machine in the following manner:

Instead of the frame being made of a casting with laminated pole pieces bolted to it, as is common practice in ordinary direct current machines, the frame of my machine is made of soft steel bars. Two of these bars are bent into end rings, 14, which are preferably made endless by welding the ends of each ring together. The rings, 14, are spaced apart, longitudinally, out of the zone of the armature and field poles and between them are assembled a number of straight steel bars, 15, which may be of the same character of material and cross section as those from which the rings, 14, are made. The ends of the bars, 15, are preferably welded to the rings, 14, at the points, 16, as shown in Figs. 1 and 6. The bars, 15, are properly spaced apart around the armature to support portions of the field pole pieces in a manner which will presently be described.

The number of these spaced apart bars, 15, to be employed depends upon the number of magnetic poles which the dynamo has. Preferably two bars are employed for each pole of the field so that there will be eight bars in a four-pole machine such as is shown in the drawings.

Before the bars, 15, are welded to the rings, 14, there are attached to them, in the zone of the armature, 4, and field laminations, 17, preferably by welding, the parts, 18, of magnetizable material, preferably of soft steel.

Figure 4:
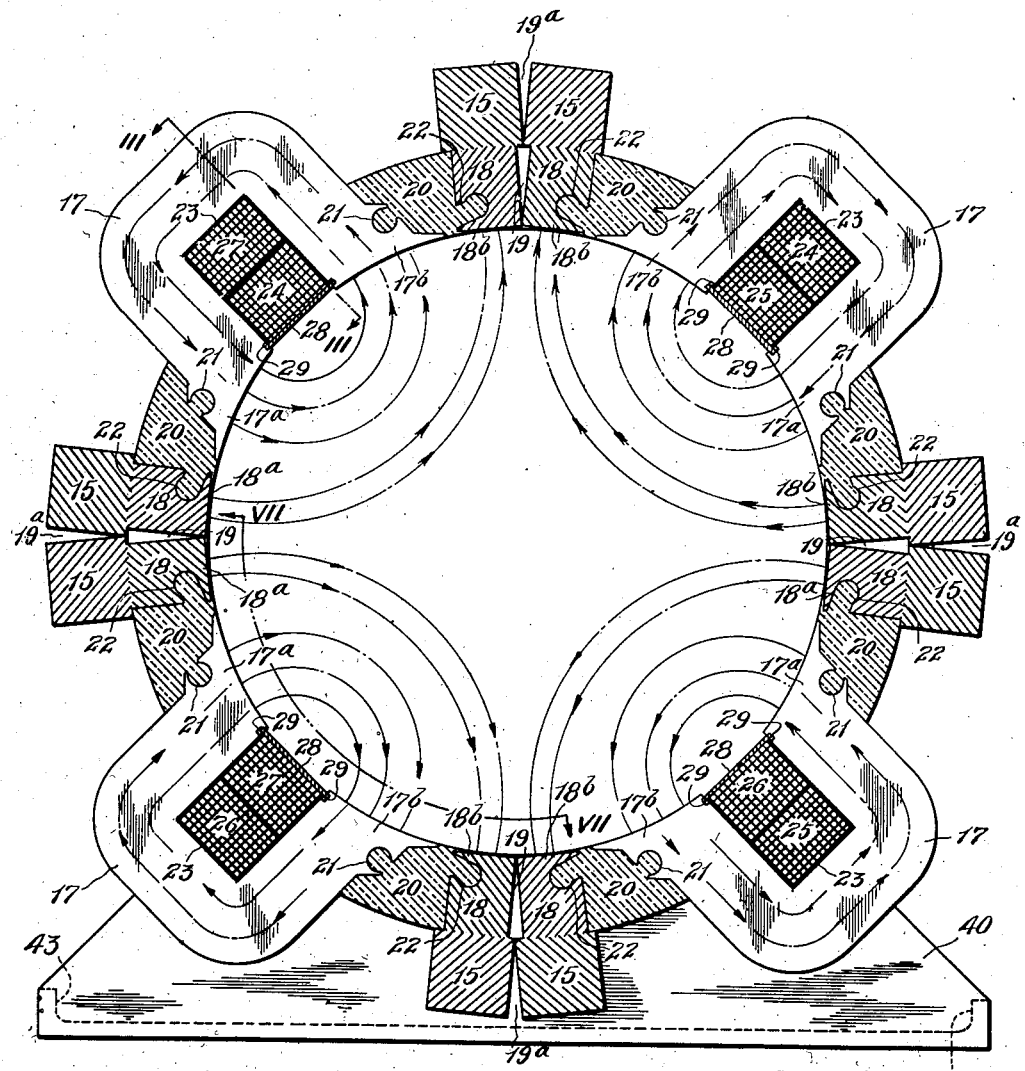
Fig. 4 is a section on line IV—IV of Fig. 1.

The bars, 15, with the parts, 18, secured to them are preferably assembled in pairs, recesses, 19, 19$^a$, being left respectively between the two parts, 18, and the two bars, 15, forming pairs as shown in Fig. 4. It will be seen that the parts, 18, constitute portions of the field pole pieces of the machine.

The bars, 15, with the pole pieces, 18, secured to them, and the groups of laminations, 17, may now be assembled in a jig so that these parts will be held in the relative positions, shown in Fig. 4, and while so held, non-magnetic metal, 20, may be cast into the spaces between the laminations, 17, and the parts, 18. This jig should be preferably so made that the internal surfaces of the parts, 18, and of the laminated parts, 17, of the field, members lie and are securely held on the circumference of a circle forming the "bore" of the fields as shown in Fig. 4. I prefer, however, to leave the pole faces, 18$^a$, 18$^b$, of the poles, 18, flat, tangent to the circle of the field bore as I have found it unnecessary to form these short pole faces upon the arc of a circle.

After the field pole parts have been thus secured together by the cast metal, 20, the ends of bars, 15, are welded to the rings, 14.

The laminations, 17, and the parts, 18, are preferably provided with re-entrant or dovetail recesses, 21 and 22, respectively, into which recesses the cast, non-magnetic metal, 20, flows and, when it cools, secures the parts, 17 and 18, firmly together. The field frame is provided with a substantially continuous, smooth "bore," as shown in Fig. 4 without subsequent machining. When thus constructed I have found it to be unnecessary to bore the field members as the pole faces are accurately positioned by the method of construction just described. The rings, 14, may be bored to receive the bearing housings, 11, after being welded to the bars, 15.

I have found a suitable metal for the non-magnetic, cast members, 20, one which is composed of a zinc base containing some aluminum and copper. This metal is such as is commonly used for die castings.

The bifurcated laminations, 17, are provided with recesses, 23, which receive the field coils, 24, 25, 26 and 27. It will be observed that the branches, 17$^a$, 17$^b$, of each group of bifurcated laminations constitute portions of adjacent opposite pole pieces of the field magnets, of which the parts, 18 are also portions. The laminations, 17, being separated from the other magnetizable portions of the magnetic circuits by air gaps and by the non-magnetizable parts, 20, may be said to be magnetically isolated. It will be seen that each of the field pole pieces is divided into a plurality of parts, magnetically isolated from each other.

The field coils may be held in place by metal strips, 28, which are preferably disposed in notches, 29, formed in the laminations, 17. As the strips, 28, are of thin material they may be of either non-magnetic or magnetic material as preferred. I prefer to form the field coils so that they may be assembled and connected symmetrically around the armature as shown, each of the field coil slots receiving two half coils or coil sides.

Figure 5:
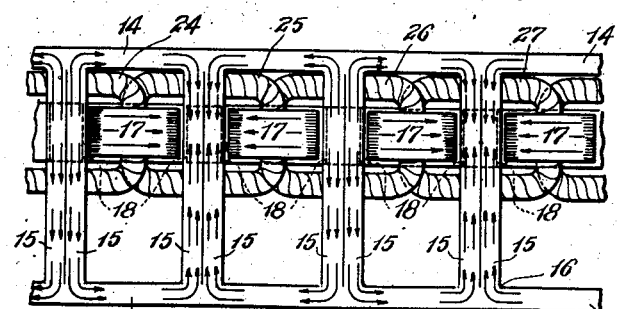
Fig. 5 is a development of the field frame showing the directions of magnetic flux therein.

When the field coils are energized, magnetic flux is set up in the assembled structure as is indicated in Figs. 4 and 5.

This field flux will pass from one pole for instance, 17$^a$, of the laminations, 17, across the air gap, through the armature, across the air gap to the other pole, 17$^b$, of the same group of field laminations and back to the point of beginning through the laminations, 17. Another portion of the magnetic flux will start from the pole, 18$^a$, of one of the pairs of poles, 18, pass through the air gap, through the armature, across the air gap to the pole, 18$^b$, of the next pair of poles, 18, which is of opposite polarity to the poles, 18$^a$, through one bar, 15, through a quadrant of the ring, 14, through another bar, 15, and from this bar, 15, through the part, 18, to the point of beginning.

It will be observed that the abutting tips of the pole parts, 17 and 18, are quite close together at the field bore, but that they rapidly recede from each other as they extend away from the armature. This results in the face of each pole piece presenting a nearly continuous iron surface to the armature, but also interposes great magnetic reluctance between one group of laminations and the next, and between the groups of laminations, 17, and the parts, 18. This magnetic isolation of the various parts which constitute the magnetic circuit of the magnetic flux set up by current in the armature is an important feature of my invention.

Fig. 5 shows an external development of the frame and field coils and the directions of the magnetic flux in the field frame members.

The object of the construction described in the foregoing is to provide paths of small reluctance through circuits composed almost entirely of iron for the useful magnetic flux set up by current in the field coils but at the same time to interpose long air gaps of very great magnetic reluctance in the path of the magnetic flux which results from the load current in the armature. The paths of the useful, torque-producing, magnetic flux which have been traced in the foregoing are shown in Figs. 4 and 5.

It is known that the magnetic flux set up by current in the armature tends to oppose one half of the field magnetic flux and to augment the other half thus distorting the symmetrical magnetic field produced by current in the field coils. This causes a shifting of the points of commutation around the commutator making necessary the various well known expedients employed to produce satisfactory operation. In previously known machines the magnetic flux due to current in the armature has to cross only the same air gap that the useful flux crosses and in such machines the path through which the magnetic flux due to current in the armature passes has no greater magnetic reluctance than has the path of the useful or field magnetic flux. In my machine the flux due to current in the armature is obliged to traverse a circuit which is largely through the air. By referring to the preferred embodiment of my invention shown in the drawings, it will be seen that the centers of the armature poles will be produced opposite the recesses, 23, which receive the field coils and that any magnetic flux due to current flowing in the armature which passes from one armature pole to another has to cross the air gap between the field poles and the armature and then, after traversing a short iron path, encounters a very high magnetic reluctance in getting through the air from one group of laminations, 17, to the next. Some of the flux will escape into the air from the laminations, 17, and find its way through very long air paths to the groups of similar laminations on either side. Some of the flux will pass through the non-magnetic metal parts, 20, through the parts, 18, and in going from one part, 18, to the other of a pair will have to pass through the air spaces, 19, 19ᵃ, and again cross the air gap between the armature and the field pole pieces before completing its circuit. Thus while the magnetic circuits for the useful magnetic flux are entirely through iron except for the air gap between the armature and field pole pieces, the magnetic circuits for the flux set up by current in the armature are largely through the air except for the armature core.

It will be noted that there is a neutral point in the field magnetic circuit at the center of each pair of pole pieces, 18, and that the magnetic flux in one of the members of each pair of parts, 18, is augmented while that in the other member of the pair is opposed by the magnetic flux set up by current in the armature. The resultant distortion of the field flux in these closely associated members of the pair is very small due to the fact that only a small portion of the magnetizing effect of the armature is acting on this portion of the magnetic circuit.

It will be observed that the magnetic reluctance interposed in the path of the armature flux in my dynamo electric machine is many times the reluctance interposed in the path of the armature flux of machines known prior to my invention, and that consequently the magnetic flux due to the load current in the armature windings of my machine is correspondingly less. One of the well known limitations in the capacity of the ordinary direct current dynamo is the allowable distortion of the magnetic field due to the load currents in the armature. This limitation is practically eliminated in dynamos constructed in accordance with my invention.

In order to keep the distortion of the magnetic field within practical limits direct current dynamos as heretofore constructed have been provided with long air gaps between the armature and the field pole pieces, ordinarily from three to six or eight times the length of air gaps of alternating current induction motors of the same horse power. A long air gap, as explained above, tends to reduce the distortion of the magnetic field by load currents in the armature. Unfortunately, this increase in the length of the air gap also increases the reluctance of the path of the useful magnetic flux and necessitates the use of large field coils, providing a large number of ampere turns, to force the useful magnetic flux across the long air gap necessary to reduce to practical limits the magnetic flux due to the armature load current. These large field coils are expensive and occupy so much radial space that the field frame yoke which provides the magnetic circuit between the poles in such dynamos is necessarily of larger diameter and heavier than the frame of an alternating current induction motor of the same capacity. By causing the magnetic flux set up by current in the armature to traverse a different path from that traversed by the useful magnetic flux and by interposing much greater reluctance in the path of the armature flux than that in the path of the field flux I am able to prevent the distortion of the magnetic field and to greatly economize space and materials in the construction of a machine of a given capacity and speed.

My invention makes it possible to construct a direct current dynamo having a working air gap between armature and field of a length approximating that of an induction motor of the same capacity. This short air gap makes possible the use of small magnetizing field coils the cost of which is small compared to the cost of the field coils used upon direct current dynamos of heretofore known construction. As the field coils are small, the field frame is also small so that the outside dimensions of a dynamo constructed in accordance with my invention, are correspondingly reduced. The actual weight of the stationary portion of a dynamo constructed according to my invention is considerably less than half that of the corresponding portion of an ordinary direct current dynamo and the weight of a complete dynamo embodying my invention is approximately half that of the corresponding dynamo of ordinary construction of the same speed and capacity.

While the field pole pieces in the ordinary type of dynamo are continuous solid blocks with uninterrupted pole faces extending parallel to the armature surface, it will be observed that in my invention, as shown in Fig. 4, each pole piece is composed of one leg or branch of each of two separate groups of bifurcated laminations, 17, and a pair of parts, 18. It will also be observed that the pole faces of my dynamo are not continuous nor are the pole pieces themselves continuous solid blocks as in the case of the ordinary dymano. The effect of this construction is to divide the path of the useful flux through the field members into a plurality of circuits magnetically in parallel but isolated from each other except in the armature core where they traverse common paths. By thus dividing the iron circuits through the field members, I am able to compel the flux set up by current in the armature to traverse long air gaps and to be consequently greatly reduced.

It is a well known fact that in the ordinary dynamo electric machine, the iron losses increase with the load. This is due to the fact that the maximum tooth induction at full load tends to be nearly twice that at no load.

The maximum tooth induction is due to the magnetic flux set up by the maximum armature ampere turns and to the field ampere turns. In my machine the increase in tooth induction due to the armature flux which increases with the load in the armature is much less than in the ordinary machine. This is due to the fact that in my machine the continuity of the iron circuit of the armature flux is broken by the long air gaps above mentioned. Consequently the increase in iron losses does not follow the increase in armature load in my machine to anywhere near the extent that it does in the ordinary machine.

To support my machine and provide for adjusting its position for the purpose of tightening the belt, where belt drive is used, or for properly aligning and positioning the armature shaft where gear drive or direct coupling is used, I prefer to provide pedestal members such as shown at 40 which may be welded to the rings, 14, at 41, 42. The members, 40, may be made of standard rolled angle bars. Abutments, 43, for the adjusting screws, 44, may be struck up from the metal of the members, 40, and reinforced by welding-in fillets where necessary. Sliding rails, 45, of rolled channels or other convenient standard structural shapes may be employed, and end portions, 46, of standard rolled angles may be welded to the rails, 45, to afford convenient thrust brackets for the screws, 44, and flanges for the anchoring or supporting bolts, 47. Slots, 48, may be provided in the rails, 45, in which the bolts, 49, which secure the pedestals, 40, in adjusted position upon the rails, 45, may slide during adjustment of the machine.

It will be observed that my improvements result in an extremely light machine thus effecting a great saving in cost of materials; that the labor cost for constructing the machine is low; that the machine is mechanically strong and rugged; that its efficiency is high; and that its operation is satisfactory. In fact, I am able to rate my machines at very much greater capacity, under standard temperature rise ratings, for a given weight of machine than any other direct current machines with which I am familiar.

It is to be understood that I do not limit my invention to the particular construction shown and described herein but that changes and modifications may be made, if its construction be in accordance with the following claims, without departing from the spirit or scope of my invention.

Having thus described my invention I claim:

1. In a dynamo electric machine a field frame having separated end rings forming magnetic yokes, spaced-apart bars of magnetizable material joining said rings, pole pieces secured to said bars intermediate said rings, and groups of laminations between said rings and between said bars magnetically isolated from said bars and said rings but secured in fixed relation thereto by means composed of non-magnetizable material.

2. In a dynamo electric machine the combination with the armature, shaft, bearings and bearing supports, of a field frame composed of spaced-apart end members, spaced-apart longitudinal members connecting said end members, laminations of magnetizable material between said longitudinal members and between said end members in the zone of said armature, and non-magnetizable means supporting said laminations.

3. In a dynamo electric machine, a field frame composed of spaced-apart end members, spaced-apart longitudinal members joining said end members and pole pieces between said spaced-apart longitudinal members, said pole pieces being supported in magnetically isolated relation to said end members.

4. In a dynamo electric machine a field frame having spaced-apart end members, a plurality of spaced-apart bars joining said end members, pole pieces secured to said bars intermediate said end members, and bifurcated pole pieces supported in magnetically isolated relation to each other and to said end members and said bars, between said bars and between said end members.

5. The method of making direct current dynamo electric machines consisting of assembling and securing in their proper relative positions laminations recessed on their armature side capable of receiving field coils, pole pieces attached to spaced-apart bars, casting non-magnetic metal between said laminations and said pole pieces to lock them in said positions, and welding end rings to said spaced-apart bars.

6. In a direct current dynamo electric machine a revoluble shaft carrying an armature, a field frame composed of spaced-apart bars attached to spaced-apart end rings, groups of laminations of magnetic material between said spaced-apart bars and between said end rings, said laminations including pole piece sections radially disposed about said armature, said bars also carrying pole piece sections radially disposed about said armature, the pole pieces and the said sections of each of the pole pieces of the machine being mechanically secured together by non-magnetic, cast-in metal.

7. In a dynamo electric machine a field frame having separated end rings forming magnet yokes, spaced-apart bars of magnetizable material joining said rings, pole pieces secured to said bars intermediate said rings, and other pole pieces between said rings and between said bars, magnetically isolated from said bars and said rings but secured in fixed relation thereto by means composed of non-magnetizable material.

8. In a dynamo electric machine a field frame having separated end rings forming magnet yokes, spaced-apart bars of magnetizable material joining said rings, pole pieces secured to said bars intermediate said rings, and other pole pieces provided with coil-receiving recesses between said rings and between said bars, said last named pole pieces being magnetically isolated from said first named pole pieces but secured in fixed relation thereto by means composed of non-magnetizable material.

9. In a dynamo electric machine, the combination with the armature, shaft, bearings and bearing supports, of a field frame composed of spaced-apart, end members, spaced-apart longitudinal members joining said end members, pole pieces secured to said longitudinal members in the zone of the armature, and other pole pieces provided with coil-receiving recesses between said longitudinal members and between said end members in the zone of the armature, and non-magnetizable means supporting said last named pole pieces.

10. In a direct current dynamo electric machine having a revolving armature and a shaft therefor, a field frame composed of spaced-apart bars attached to spaced apart end rings, pole pieces on said bars in the zone of said armature, said bars and rings constituting magnet yokes for said pole pieces the direction of flow of the magnetic flux in said bars being parallel to said shaft, other pole pieces supported in the zone of the armature between said first named pole pieces in magnetically isolated relation thereto, said last named pole pieces being bifurcated to provide coil-receiving recesses, and magnet coils in said recesses.

11. In a dynamo electric machine, having a revolving armature and a shaft therefor, a field frame comprising a pair of magnet poles of opposite polarity, each pole comprising two magnetically isolated sections, one section of each pole being joined to one section of the other pole by a yoke disposed in a plane transverse to the axis of the armature, and the other section of the first named pole being joined to the other section of said other pole by a yoke disposed in a plane parallel to the axis of the armature.

12. In a dynamo electric machine having a revolving armature and a shaft therefor, a field frame comprising a plurality of pairs of magnet poles of opposite polarity, each pole comprising a plurality of magnetically isolated sections, a section of one pole being joined to a section of a pole of opposite polarity, by a yoke disposed in a plane transverse to the axis of the armature and another section of the first named pole being joined to another section of said pole of opposite polarity by a yoke disposed in a plane parallel to the axis of said armature.

In testimony whereof I affix my signature.

JOHN C. LINCOLN.